United States Patent
Kana et al.

(10) Patent No.: US 11,914,054 B2
(45) Date of Patent: Feb. 27, 2024

(54) SYSTEM AND METHODS FOR ESTIMATING ATTITUDE AND HEADING BASED ON GNSS CARRIER PHASE MEASUREMENTS WITH ASSURED INTEGRITY

(71) Applicant: Honeywell International s.r.o., Chodov (CZ)

(72) Inventors: Zdenek Kana, Dubnany (CZ); Radek Baranek, Litovel (CZ); Jindrich Dunik, Plzen (CZ); Jussi Raasakka, Brno (CZ); Milos Sotak, Košice-Šaca (SK)

(73) Assignee: Honeywell International s.r.o., Prague (CZ)

( * ) Notice: Subject to any disclaimer, the term of this patent is extended or adjusted under 35 U.S.C. 154(b) by 275 days.

(21) Appl. No.: 17/244,418

(22) Filed: Apr. 29, 2021

(65) Prior Publication Data

US 2022/0075082 A1    Mar. 10, 2022

Related U.S. Application Data (60) Provisional application No. 63/076,649, filed on Sep. 10, 2020.

(51) Int. Cl.
*G01S 19/47* (2010.01)
*G01S 19/45* (2010.01)
(Continued)

(52) U.S. Cl.
CPC .............. *G01S 19/47* (2013.01); *G01S 19/45* (2013.01); *G01S 19/54* (2013.01); *G01C 21/165* (2013.01);
(Continued)

(58) Field of Classification Search
CPC .......... G01S 19/47; G01S 19/41; G01S 19/54; G01S 19/53; G01S 19/48; G01S 19/40;
(Continued)

(56) References Cited

U.S. PATENT DOCUMENTS

| | | | |
|---|---|---|---|
| 6,424,914 B1 * | 7/2002 | Lin | G01S 19/28 |
| | | | 701/472 |
| 7,312,747 B2 | 12/2007 | Vollath et al. | |

(Continued)

FOREIGN PATENT DOCUMENTS

| | | |
|---|---|---|
| CN | 103744101 B | 3/2016 |
| CN | 111239787 A | 6/2020 |

(Continued)

OTHER PUBLICATIONS

Teunissen, "A-PPP: Array-Aided Precise Point Positioning With Global Navigation Satellite Systems", IEEE Transactions on Signal Processing, Jun. 2012, pp. 1 through 13, vol. 60, No. 6, IEEE.

(Continued)

*Primary Examiner* — Chuong P Nguyen
(74) *Attorney, Agent, or Firm* — Fogg & Powers LLC (57) ABSTRACT

Systems and methods for estimating attitude and heading are provided. The systems and methods utilize carrier phase single difference (CSD) measurements or carrier phase double difference (CDD) measurements and a validation test for CSD or CDD measurement residuals. The systems and methods include applying a wrapping function with limit of ±half of the GNSS carrier signal wavelength to CSD or CDD measurement residuals to generate refined CSD or CDD measurement residuals and validating the refined CSD or CDD measurement residuals variance to determine valid CSD or CDD measurements. By using the validated CSD and CDD measurements, the systems and methods enable low grade hybrid inertial navigation systems to estimate (Continued)

attitude and heading with integrity and without a magnetometer or the need for integer ambiguity resolution even during the static or steady phases of flight/operation.

20 Claims, 3 Drawing Sheets (51) Int. Cl.
G01S 19/54 (2010.01)
G01C 21/16 (2006.01)
G01C 21/20 (2006.01)
G01S 19/41 (2010.01)
G01S 19/53 (2010.01)
G01S 19/40 (2010.01)

(52) U.S. Cl.
CPC .............. G01C 21/20 (2013.01); G01S 19/40 (2013.01); G01S 19/41 (2013.01); G01S 19/53 (2013.01)

(58) Field of Classification Search
CPC ....... G01S 19/55; G01S 19/45; G01C 21/165; G01C 21/20
USPC ...... 342/352, 357.3, 357.24, 357.28, 357.31, 342/357.36, 357.37, 357.38, 357.23
See application file for complete search history.

(56) References Cited

U.S. PATENT DOCUMENTS

| | | | |
|---|---|---|---|
| 7,355,549 B2* | 4/2008 | Fukuda | G01S 19/41 342/357.38 |
| 8,471,762 B2 | 6/2013 | Zietz et al. | |
| 8,638,257 B2 | 1/2014 | Fenton | |
| 8,665,145 B2 | 3/2014 | Dai et al. | |
| 9,557,418 B2 | 1/2017 | Weed et al. | |
| 9,829,582 B2* | 11/2017 | Wu | G01S 19/49 |
| 9,971,037 B2 | 5/2018 | Dickman | |
| 10,048,074 B1* | 8/2018 | Malinak | G01C 21/18 |
| 10,261,194 B2* | 4/2019 | Kundak | G01S 19/53 |
| 10,338,233 B2 | 7/2019 | Green | |
| 10,677,933 B1* | 6/2020 | Gavrilets | G01C 21/20 |
| 10,877,163 B2* | 12/2020 | Nakamura | G01C 19/00 |
| 11,372,114 B2* | 6/2022 | Carcanague | G01S 19/49 |
| 11,585,951 B1* | 2/2023 | Gavrilets | G01C 23/005 |
| 2002/0120400 A1 | 8/2002 | Lin | |

FOREIGN PATENT DOCUMENTS

| | | | |
|---|---|---|---|
| EP | 2624013 A1 | 8/2013 | |
| EP | 2966477 A1 * | 1/2016 | .......... G01S 19/073 |
| EP | 3190430 A1 | 7/2017 | |
| JP | 2007163335 A | 6/2007 | |

OTHER PUBLICATIONS

Wang et al., "On-The-Fly Ambiguity Resolution Based on Double-Differential Square Observation", Sensors 2018, vol. 60, No. 6, 2495, Aug. 2018, pp. 1 through 16, www.mdpi.com/journal/sensors.
European Patent Office, "Extended European Search Report from EP Application No. 21183822.2", from Foreign Counterpart to U.S. Appl. No. 17/244,418, filed Mar. 31, 2022, pp. 1 through 14, Published: EP.
Groves, Paul D., "Fault Detection, Integrity Monitoring, and Testing" Principles of GNSS, Inertial and Multisensor Integrated Navigation Systems, Mar. 1, 2013, pp. 701 through 727, Chapter 17, Artech House, created from epo-ebooks on Mar. 17, 2022.
Groves, Paul D., "Kalman Filter-Based Estimation", Principles of GNSS, Inertial and Multisensor Integrated Navigation Systems, Mar. 1, 2013, pp. 81 through 136, Chapter 3, Artech House, created from epo-ebooks on Mar. 17, 2022.

* cited by examiner

SYSTEM AND METHODS FOR ESTIMATING ATTITUDE AND HEADING BASED ON GNSS CARRIER PHASE MEASUREMENTS WITH ASSURED INTEGRITY

CROSS-REFERENCE TO RELATED APPLICATIONS

This application claims the benefit of U.S. Provisional Application Ser. No. 63/076,649, filed Sep. 10, 2020, and titled "SYSTEM AND METHODS FOR ESTIMATING ATTITUDE AND HEADING BASED ON GNSS CARRIER PHASE MEASUREMENTS WITH ASSURED INTEGRITY," which is hereby incorporated herein by reference.

STATEMENT REGARDING NON-US SPONSORED RESEARCH OR DEVELOPMENT

The project leading to this application has received funding from the Clean Sky 2 Joint Undertaking under the European Union's Horizon 2020 research and innovation programme under grant agreement No 807097.

BACKGROUND

Low grade hybrid inertial navigation systems (for example, Global Navigation Satellite System (GNSS)-aided Attitude and Heading Reference System (GPAHRS) depend on external measurements to aid heading during static or steady phases of flight/operation. These systems are not able to estimate heading using gyro compassing, so a magnetometer is typically used to provide the heading estimate. However, using magnetometers is problematic because magnetometers are vulnerable to environmental conditions and have limited performance that is dependent on position (cannot be used near the magnetic poles).

SUMMARY

In an example, a method for estimating attitude and heading of a system includes obtaining inertial measurements from one or more inertial sensors and raw carrier phase measurements from two or more Global Navigation Satellite System (GNSS) receivers communicatively coupled to respective GNSS antennas. The method further includes determining carrier phase double difference (CDD) measurements from the raw carrier phase measurements, and determining predicted CDD values based on statistical filter predicted states. The method further includes determining CDD measurement residuals and respective variances based on the CDD measurements and the predicted CDD values, and applying a wrapping function with limit of ±half of the GNSS carrier signal wavelength to CDD measurement residuals to generate refined CDD measurement residuals. The method further includes validating the refined CDD measurement residuals variance to determine valid CDD measurements, and estimating attitude and heading of the system using the valid CDD measurements and the inertial measurements.

In another example, a system includes one or more inertial sensors configured to capture inertial measurements. The system further includes a first Global Navigation Satellite System (GNSS) receiver communicatively coupled to a first GNSS antenna, wherein the first GNSS receiver is configured to receive signals from a plurality of GNSS satellites. The system further includes a second Global Navigation Satellite System (GNSS) receiver communicatively coupled to a second GNSS antenna, wherein the second GNSS receiver is configured to receive signals from a plurality of GNSS satellites. The system further includes at least one processor communicatively coupled to a memory, the one or more inertial sensors, the first GNSS receiver, and the second GNSS receiver. The at least one processor is configured to obtain the inertial measurements from the one or more inertial sensors and obtain raw carrier phase measurements from the first GNSS receiver and the second GNSS receiver. The at least one processor is further configured to determine carrier phase double difference (CDD) measurements from the raw carrier phase measurements and determine predicted CDD values based on statistical filter predicted states. The at least one processor is further configured to determine CDD measurement residuals and respective variances based on the CDD measurements and the predicted CDD values and apply a wrapping function with limit of ±half of a GNSS carrier signal wavelength to the CDD measurement residuals to generate refined CDD measurement residuals. The at least one processor is further configured to validate the refined CDD measurement residuals to determine valid CDD measurements and estimate attitude and heading of the system using the valid CDD measurements and the inertial measurements.

In another example, a system includes one or more inertial sensors configured to capture inertial measurements. The system further includes a first Global Navigation Satellite System (GNSS) receiver communicatively coupled to a first GNSS antenna, wherein the first GNSS receiver is configured to receive signals from a plurality of GNSS satellites. The system further includes a second Global Navigation Satellite System (GNSS) receiver communicatively coupled to a second GNSS antenna, wherein the second GNSS receiver is configured to receive signals from a plurality of GNSS satellites. The system further includes at least one processor communicatively coupled to a memory, the one or more inertial sensors, the first GNSS receiver, and the second GNSS receiver. The at least one processor is configured to obtain the inertial measurements from the one or more inertial sensors and obtain raw carrier phase measurements from the first GNSS receiver and the second GNSS receiver. The at least one processor is further configured to determine carrier phase single difference (CSD) measurements from the raw carrier phase measurements and determine estimates of clock bias between the first GNSS receiver and the second GNSS receiver based on the CSD measurements. The at least one processor is further configured to determine predicted CSD values based on statistical filter predicted states and determine CSD measurement residuals and respective variances based on the CSD measurements and the predicted CSD values. The at least one processor is further configured to apply a wrapping function with limit of ±half of a GNSS carrier signal wavelength to the CSD measurement residuals to generate refined CSD measurement residuals. The at least one processor is further configured to validate the refined CSD measurement residuals to determine valid CSD measurements and estimate attitude and heading of the system using the valid CSD measurements and the inertial measurements.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Many navigation systems include a GNSS antenna and blend/integrate/hybridize GNSS aiding information with navigation information from inertial sensors. However, the heading of the navigation system is generally not directly observable using single GNSS antenna measurements. Even the navigation systems integrating single GNSS antenna measurements and low-grade inertial sensors depend on external sensor measurements to aid heading during static or steady phases of flight/operation (from a magnetometer, for example). Since aircraft typically include more than one GNSS antenna and receiver on board, dual antenna GNSS heading estimation algorithms can be used in place of a magnetometer. However, dual antenna GNSS heading algorithms operate using carrier phase measurements where integer ambiguity needs to be estimated, which has proven difficult. Further, integrity monitoring assurance of the dual antenna GNSS heading solutions is also very challenging.

Some example systems and methods described herein utilize carrier phase double difference (CDD) measurements to aid a hybrid (for example, INS/GNSS) navigation system and implement a validity test for the CDD measurements to assure integrity of each CDD measurements used to aid the hybrid navigation system. The validity test includes determining whether the variances of CDD measurement residuals are below a threshold. In some examples, the validity test is applied to each measurement update. In other examples, the validity test is applied in the first iteration and carrier phase ranges integer ambiguities are determined and accumulated carrier phases, usually represented in the form of delta ranges, are used to propagate them during the next iterations. In some examples, the CDD measurements are also decorrelated to enable sequential measurement processing, which reduces computational load.

Some example systems and methods described herein utilize carrier phase single difference (CSD) measurements to aid a hybrid (for example, INS/GNSS) navigation system. The first CSD measurement is provided to a global statistical estimator, which uses the first CSD measurement to estimate the clock bias between GNSS receivers. A global statistical estimator provides a globally valid state estimate and does not rely on local (in terms of estimated and true states) validity constraints. In some examples, the global statistical estimator can be a particle filter or point-mass filter. In other implementations, the actual clock bias between GNSS receivers can be identified first based on all CSD measurements (for example, using a trigonometric function based averaging algorithm), and then a local statistical estimator, such as the extended Kalman filter, can be deployed to hybridize all available sensor measurements and potentially to finely tune the actual clock bias. After the clock bias between the GNSS receivers is estimated or identified, the systems and methods implement a validity test for the CSD measurements to assure integrity of each of the CSD measurements used to aid the hybrid navigation system. The validity test includes determining whether the variances of CSD measurement residuals are below a threshold. In some examples, the validity test is applied to each measurement update. In other examples, the validity test is applied in the first iteration after the clock bias between the GNSS receivers is estimated, carrier phase ranges integer ambiguities are determined, and accumulated carrier phases, usually represented in the form of delta ranges, are used to propagate them during the next iterations.

The example systems and methods enable low grade hybrid inertial navigation systems to estimate attitude and heading with integrity and without a magnetometer or the need for integer ambiguity resolution even during the static or steady phases of flight/operation.

Figure 1:
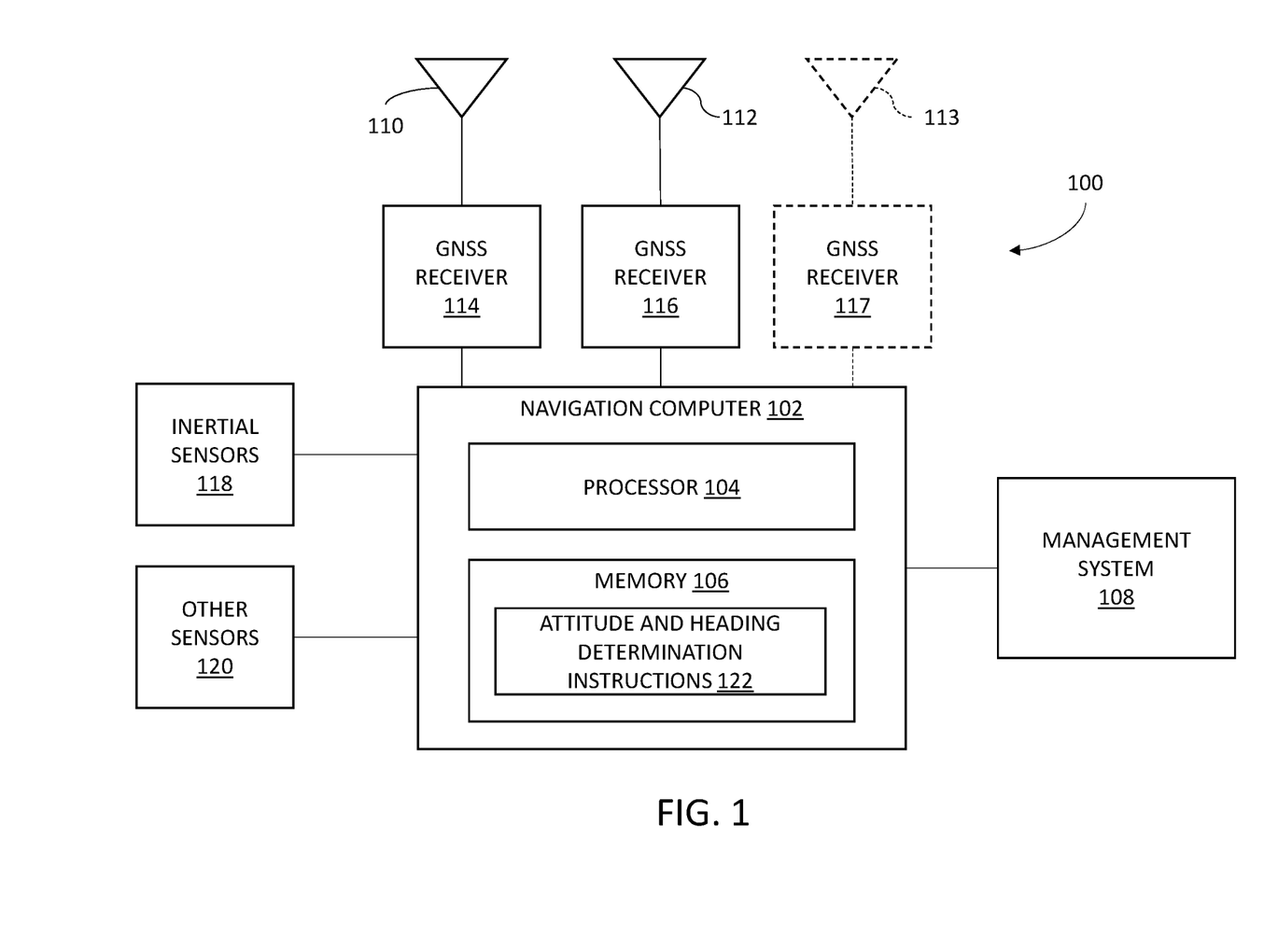
FIG. 1 is a block diagram of an example navigation system.

FIG. 1 illustrates a block diagram of an example navigation system 100. In the example shown in FIG. 1, the navigation system 100 includes a navigation computer 102, management system 108, GNSS antennas 110, 112, GNSS receivers 114, 116, inertial sensors 118, and other sensors 120.

In some examples, the navigation system 100 is mounted to or incorporated into a vehicle (for example, an aircraft, sea craft, spacecraft, automobile, or other types of vehicles). In other examples, the navigation system 100 is located on or part of a movable object (for example, a phone, personal electronics, land surveying equipment, or other objects capable of being move from one location to another). The navigation system 100 is configured to acquire navigation information from multiple sources. To handle the acquired navigation information, the navigation system 100 can include a navigation computer 102, which can include at least one processor 104 and at least one memory 106.

In some examples, the navigation system 100 acquires inertial measurements that include inertial motion information. In the example shown in FIG. 1, the navigation system 100 includes inertial sensors 118 that measure and sense the inertial motion of the navigation system 100. For example, the navigation system 100 may be an inertial navigation system (INS) that receives raw inertial measurement data from a combination of inertial sensors 118, such as gyroscopes and accelerometers. Alternatively, the inertial sensors 118 may be an INS that provides processed inertial navigation data acquired from inertial measurements to the navigation computer 102.

In some examples, the navigation system 100 may include one or more other sensors 120 to provide additional navigation information. The one or more other sensors 120 could include a vertical position sensor (for example, an altimeter), electro-optical sensors, magnetometers, barometric sensors, velocimeters, and/or other types of sensors.

In the example shown in FIG. 1, the navigation system 100 includes a first GNSS antenna 110 that is communicatively coupled to a first GNSS receiver 114 and configured to provide received GNSS signals to the first GNSS receiver 114. In the example shown in FIG. 1, the navigation system 100 also includes a second GNSS antenna 112 that is communicatively coupled to a second GNSS receiver 116 and configured to provide received GNSS signals to the second GNSS receiver 116. The first GNSS antenna 110 and the second GNSS antenna 112 are separated by a particular distance, which is referred to as a baseline. In some examples, the first GNSS antenna 110 and the second GNSS antenna 112 are coupled together via a rigid body to reduce flexibility of the baseline during operation.

The navigation system 100 optionally includes a third GNSS antenna 113 that is communicatively coupled to an optional third GNSS receiver 117. The third GNSS antenna 113, the first GNSS antenna 110, and the second GNSS antenna 112 are separated by a particular distance, which is referred to as a baseline. In some examples, the third GNSS antenna 113 and the first GNSS antenna 110 and the second GNSS antenna 112 are coupled together via a rigid body to reduce flexibility of the baseline during operation. In some examples, the third GNSS antenna 113 and the second GNSS antenna 112 are coupled together via a rigid body to reduce flexibility of the baseline during operation.

In some examples, the navigation system 100 receives satellite signals from multiple GNSS satellites that are observable to the first GNSS antenna 110, the second GNSS antenna 112, and the optional third GNSS antenna 113. For example, during operation, the GNSS receivers 114, 116 and optional GNSS receiver receive GNSS satellite signals from the presently observable GNSS satellites. As used herein, the GNSS satellites may be any combination of satellites that provide navigation signals. For example, the GNSS satellites may be part of the global positioning system (GPS), Globalnaya Navigatsionnaya Sputnikovaya Sistema (GLONASS), Galileo system, COMPASS (BeiDou), or another system of satellites that form part of a GNSS. The GNSS satellites may provide information that can be used for navigational purposes. The navigation computer 102 and GNSS receivers 114, 116 and optional GNSS receiver 117 may receive the satellite signals and extract position, velocity, and time data from the signals to acquire pseudo range and/or raw carrier phase measurements.

The processor 104 and/or other computational devices used in the navigation system 100, management system 108, or other systems and methods described herein may be implemented using software, firmware, hardware, or appropriate combination thereof. The processor 104 and other computational devices may be supplemented by, or incorporated in, specially-designed application-specific integrated circuits (ASICs) or field programmable gate arrays (FPGAs). In some examples, the processor 104 and/or other computational devices may communicate through an additional transceiver with other computing devices outside of the navigation system 100, such as those associated with the management system 108 or computing devices associated with other subsystems controlled by the management system 108. The processor 104 and other computational devices can also include or function with software programs, firmware, or other computer readable instructions for carrying out various process tasks, calculations, and control functions used in the methods and systems described herein.

The methods (such as method 200) described herein may be implemented by computer executable instructions (for example, attitude and heading determination instructions 122), such as program modules or components, which are executed by at least one processor, such as the processor 104. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device. For instance, the memory 106 may be an example of a computer readable medium capable of storing computer readable instructions and/or data structures. Also, the memory 106 may store navigational information such as maps, terrain databases, magnetic field information, path data, and other navigation information.

Suitable computer readable storage media (such as the memory 106) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In some examples, the navigation computer 102 may use statistical filtering (for example, using a local statistical estimator (for example, extended Kalman filter), a global statistical estimator (for example, particle filter, point-mass filter), or other statistical filtering techniques) to combine measurements acquired through the GNSS receivers 114, 116 with measurements acquired from the inertial sensors 118 and the other sensors 120. When the navigation computer 102 uses a Kalman filter to combine measurements, the navigation computer 102 may use a dynamic model, control inputs of the navigation system 100, and multiple sequential measurements acquired from the inertial sensors 118, the other sensors 120, and through the GNSS receivers 114, 116 and optional GNSS receiver 117 to form an estimate of navigation parameters for the navigation system 100 that is better than measurements acquired from any one of the individual measurement sources.

When implementing a Kalman filter, the navigation computer 102 (or other computing system in communication with the navigation computer 102) may perform a prediction step and an update (correction) step. In the prediction step, the navigation computer 102 may predict a state estimate and an estimated covariance of a navigation solution for the navigation system 100. In the update/correction step, the navigation computer 102 may create weighted measurements by applying a Kalman gain to measurements acquired from the measurement sources and add the weighted measurements to the predicted state estimate calculated in the prediction step. Further, when performing the update step, the navigation computer 102 calculates measurement residuals. To calculate the measurement residuals, the navigation computer 102 compares the observed measurements against the predicted state estimates. While the calculations by navigation computer 102 have been described as applying to a Kalman filter, it should be understood that this is an example and the calculations could also apply to the extended Kalman filter, unscented Kalman filter, and other statistical filters. For example, the extended Kalman filter may be applied when integrating INS and GNSS measurements.

As discussed above, when using low grade inertial sensors 118, the navigation system 100 needs to obtain heading information from another source during static or steady phases of flight/operation. In the example shown in FIG. 1, the navigation computer 102 is configured to utilize raw carrier phase measurements received by the GNSS antennas 110, 112 (and optional GNSS antenna 113, if applicable) through the GNSS receivers 114, 116 (and optional GNSS receiver 117, if applicable) in order to estimate two out of three attitude and heading angles for the navigation system 100. If the baseline in between the GNSS antennas is colinear with the x axis of body frame of the aircraft/vehicle/object, then the heading and pitch angles are directly observable.

Figure 2:
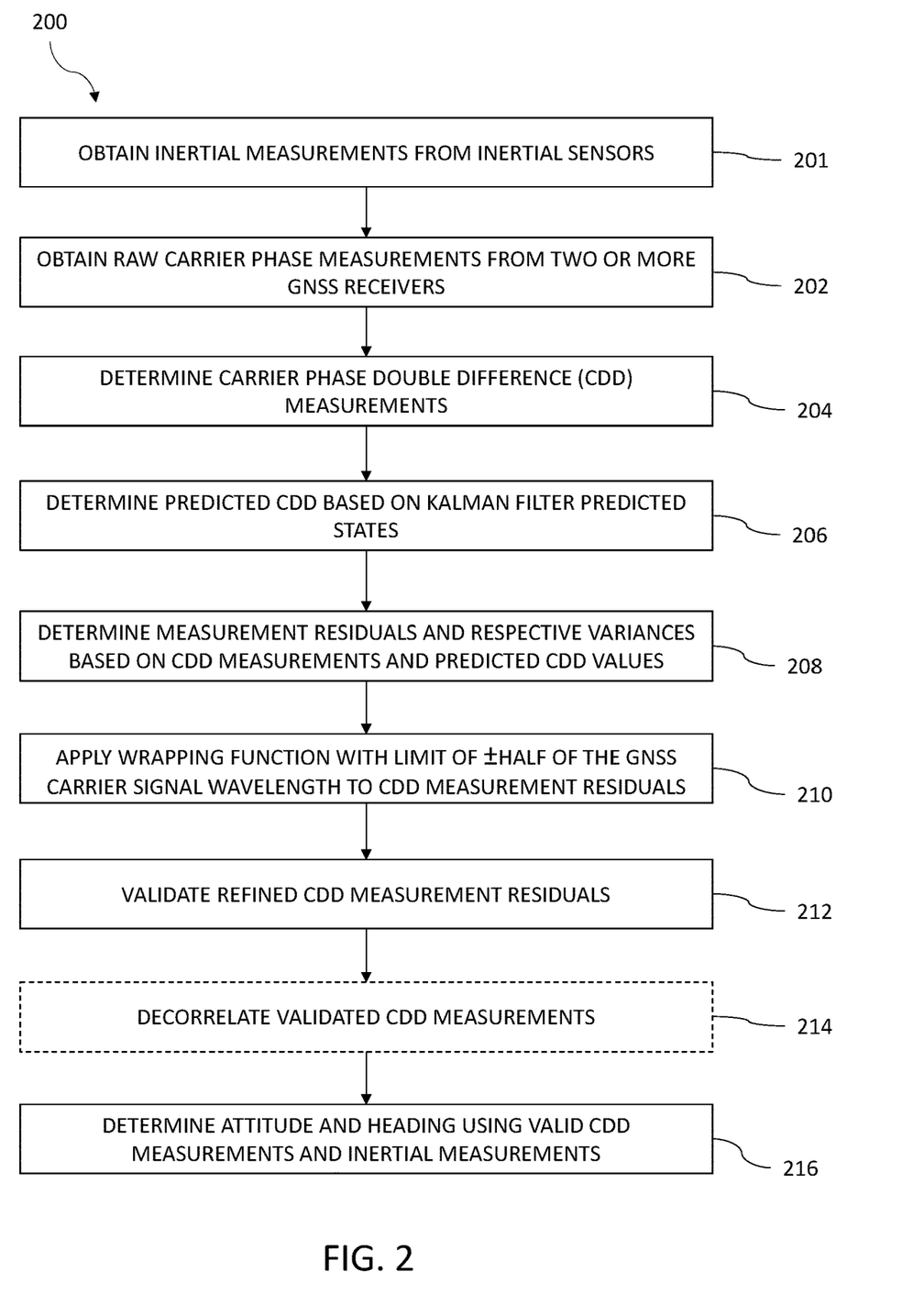
FIG. 2 is a flow diagram of an example method of estimating attitude and heading.

FIG. 2 is an example method 200 of determining the attitude and heading for a navigation system (such as, for example, navigation system 100) that is computationally efficient and assures the integrity of the measurements used to determine the attitude and heading. The common features discussed above with respect to the navigation system 100 in FIG. 1 can include similar characteristics to those discussed with respect to method 200 and vice versa.

The method 200 includes obtaining inertial measurements from inertial sensors (block 201). In some examples, the inertial sensors include one or more accelerometers and one or more gyroscopes.

The method 200 includes obtaining raw carrier phase measurements from two or more GNSS receivers (block 202). In some examples, the GNSS receivers are communicatively coupled to respective GNSS antennas that are separated by a known baseline.

The method 200 further includes determining carrier phase double difference (CDD) measurements from the raw carrier phase measurements (block 204). In some examples, the CDD measurements are obtained by determining a single difference, which is a difference between the two antenna measurements from the same satellites, and then determining a second difference of the single differences related to defined pairs of chosen satellites. Using CDD measurements generally eliminates the need to estimate clock bias in between the two GNSS receivers, which is required when using single differences. In some examples, at least one satellite (pivot satellite) of each respective defined pair of chosen satellites is selected based on that particular satellite having the smallest variances of the single difference measurement residuals. In some such examples, the pivot satellite is deployed in every CDD measurement to form all possible second differences (among the satellites in view). In some such examples, the CDD measurement residuals are refined by applying a wrapping function with limit of ±half of GNSS carrier signal wavelength. In some such examples, choosing the pivot satellite with the smallest variances of (refined) single difference measurement residuals can enable a larger number of CDD measurements passing the validity test of block 212 discussed below.

Where a third GNSS antenna (or greater number of GNSS antennas is utilized) and a third GNSS receiver (or greater number of GNSS receivers is utilized), CDD measurements related to some or all additional combination(s) of two receivers out of all GNSS receivers can be used. For example, when three GNSS antennas and receivers are used, the CDD measurements could be determined using the first and second GNSS antennas and GNSS receivers, the first and third GNSS antennas and GNSS receivers, and/or the second and third GNSS antennas and GNSS receivers.

The method 200 further includes determining predicted CDD values based on predicted states (block 206). In some examples, the predicted CDD values are determined by the navigation computer (for example, using the extended Kalman filter). In such examples, the predicted states of the extended Kalman filter used to determine the predicted CDD values include position of the navigation system, position of the satellites determined from the ephemeris, attitude, and heading, and other estimated CDD quantities (for example, errors in GNSS antennas baseline) based on the previous state of the navigation system.

The method 200 further includes determining CDD measurement residuals and related variances based on the CDD measurements and the predicted CDD values (block 208). The CDD measurement residuals are determined by taking the difference between the CDD measurements and the predicted CDD values.

Since the dynamics of all states, which are needed for the measurement residual prediction and are other than the carrier wavelength integer ambiguities, can be well predicted with performance significantly lower than carrier signal wavelength, the CDD measurement residuals can be refined. Since the signs of the CDD measurement residuals cannot be reconstructed, the method 200 further includes applying a wrapping function to the CDD measurement residuals with limit of ±half of the GNSS carrier signal wavelength (block 210).

In order to assure the integrity of the CDD measurements, the method 200 further includes validating the refined CDD measurement residuals (block 212). For the validity test of block 212, it is assumed that the navigation system will be able to measure the change in attitude and heading from an initial prediction (for example, from an attitude alignment algorithm and a standalone GNSS heading algorithm, magnetometer, etc.) and that both, the predicted and measured CDD errors have Gaussian distribution. The CDD measurement residuals are validated by determining whether the covariance of refined CDD measurement residuals satisfies a threshold. In some examples, the threshold is determined using a required Probability of Hazardously Misleading Information (PHMI) value, which is an integrity requirement for the particular application, and an independent sample rate (ISR). The PHMI value and the ISR are used to determine a sigma multiplier that is applied to the CDD measurement residual covariance. In order for the CDD measurement residuals to be validated, the following condition must be met:

$$(K_{ob}^{mod,\nabla})^2 \text{Cov}[\delta\Delta_{ref,piv} - \delta\Delta_{ref,i}] < \left(\frac{\lambda}{2}\right)^2$$

where $\lambda$ is the GNSS carrier signal wavelength and $K_{ob}^{mod,\nabla}$ is a sigma multiplier, which is defined as:

$$K_{ob}^{mod,\nabla} = Q^{-1}\left(\frac{PHMI}{ISR}\right)$$

where $Q^{-1}$ is inverse of:

$$Q(x) = \frac{1}{\sqrt{2\pi}} \int_x^\infty e^{\frac{-t^2}{2}} dt$$

In some examples, the validity test described with respect to block 212 is applied for every measurement update (for example, extended Kalman filter measurement update). In such examples, either raw carrier phase measurements or carrier phase range measurements, which are determined based on pseudo ranges, raw carrier phases, and delta ranges, can be used.

Using the validity test for every measurement update may restrict the number of CDD measurements available for use in determining attitude and heading of the navigation system. In some examples, the validity test discussed above is only applied in the first iteration. In such examples, the carrier phase ranges integer ambiguities are determined and accumulated carrier phases, usually represented in the form of delta ranges, are used to propagate them during the subsequent iterations. Since the validity test is only applied once in such examples, the threshold can be relaxed (for example, the ISR can be set to 1) and more CDD measurements can be used in the determination of attitude and heading.

Due to the second difference applied among satellites measurements, the CDD measurements are correlated with one another even though the carrier phase measurements from the GNSS receivers were not correlated. The correlation prevents direct utilization of the computationally efficient sequential processing of the CDD measurements in the filtering step of a Kalman filter. To overcome this limitation and to utilize the sequential measurement processing, a first potential option is to compute the inversion of the (full, for example, non-diagonal) CDD measurement noise covariance matrix at every time instant. Such an option, however, introduces additional computational complexity caused by the need for the covariance matrix inversion computation at each time instant.

A second potential option includes allowing the computationally effective implementation of the sequential measurement processing with the correlated measurement noise. In some examples, it can be reasonably well assumed that the carrier phase noise statistics are almost the same for a sufficiently large set of the satellite measurements with higher elevations, and the method 200 optionally includes off-line (and possibly computationally intensive) precomputation of the CCD measurement noise covariance matrix inversion (up to a scaling parameter related to the measurement noise statistic) and subsequent on-line (and computationally cheap) decorrelation of the valid CDD measurements (block 214). In some such examples, the precomputed/predetermined factorization of the covariance matrix (up to the scaling), reflecting a transformation matrix between single differences and double differences, is based on the Cholesky factorization, singular value decomposition, or other matrix decompositions. The factorized matrix can be computed for the maximum expected amount of satellites in view, and the particular portion (left upper part) of the matrix used for decorrelation is determined based on the current number of satellites in view. In this way, only a single matrix needs to be precomputed and stored, and the matrix can be used for any number of satellites in view.

The method 200 further includes estimating the attitude and heading using the valid CDD measurements and the inertial measurements (block 216). In some examples, the navigation computer (for example, implementing a Kalman filter) integrates/blends/hybridizes the CDD measurements with the inertial measurements from the inertial sensors to estimate the attitude and heading of the navigation system. By utilizing only CDD measurements that pass the validity test in block 212, the method 200 does not need to resolve the integer ambiguity and the integrity of the CDD measurements used in the estimation of attitude and heading is assured.

Figure 3:
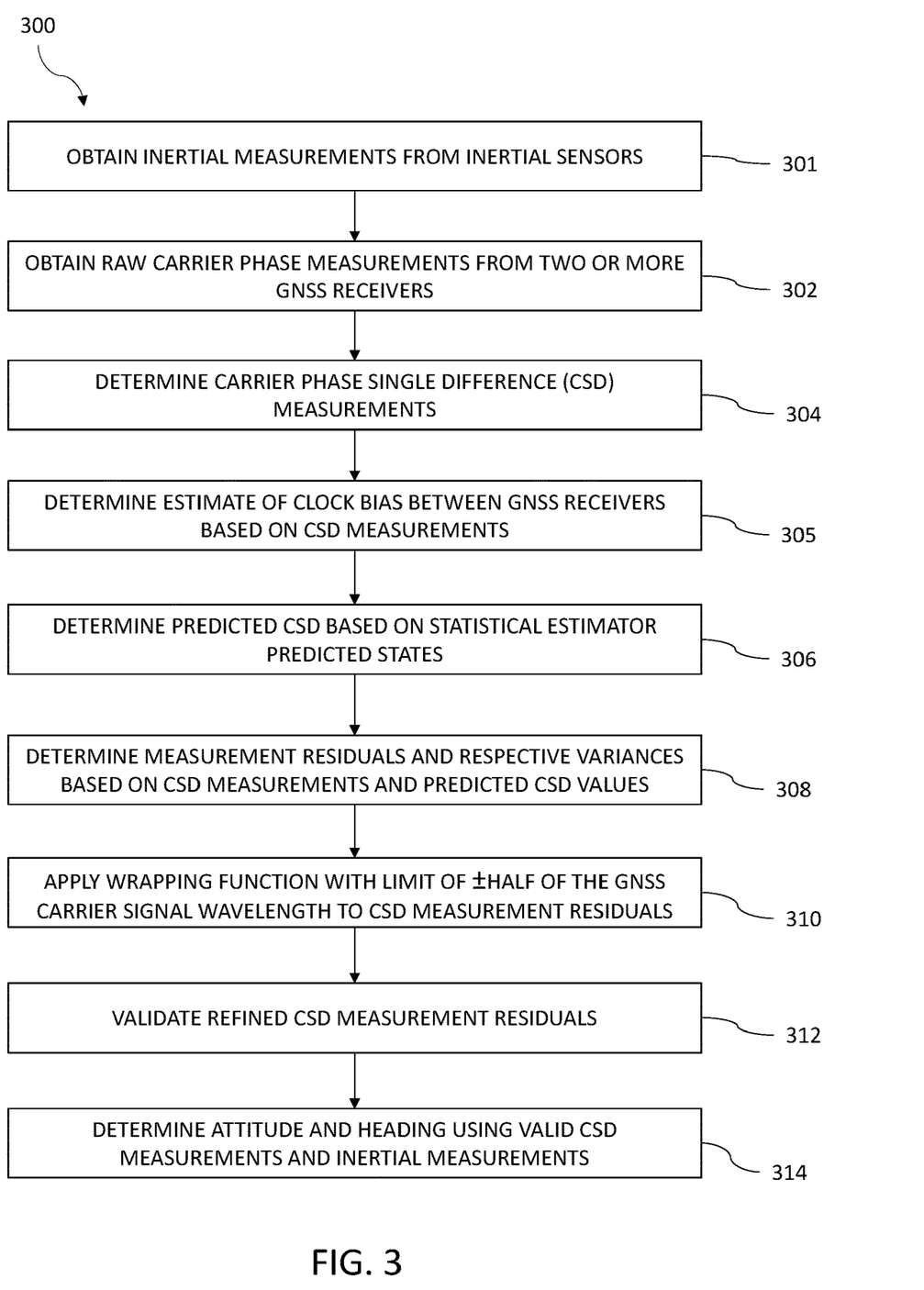
FIG. 3 is a flow diagram of an example method of estimating attitude and heading.

FIG. 3 is another example method 300 of determining the attitude and heading for a navigation system (such as, for example, navigation system 100) that is computationally efficient and assures the integrity of the measurements used to determine the attitude and heading. The common features discussed above with respect to the navigation system 100 in FIG. 1 can include similar characteristics to those discussed with respect to method 300 and vice versa.

The method 300 includes obtaining inertial measurements from inertial sensors (block 301). In some examples, the inertial sensors include one or more accelerometers and one or more gyroscopes.

The method 300 includes obtaining raw carrier phase measurements from two or more GNSS receivers (block 302). In some examples, the GNSS receivers are communicatively coupled to respective GNSS antennas that are separated by a known baseline.

The method 300 further includes determining carrier phase single difference (CSD) measurements from the raw carrier phase measurements (block 304). The CSD measurements include determining a difference between the two antenna measurements from the same satellites.

Where a third GNSS antenna (or greater number of GNSS antennas is utilized) and a third GNSS receiver (or greater number of GNSS receivers is utilized), CSD measurements related to some or all additional combination(s) of two receivers out of all GNSS receivers can be used. For example, when three GNSS antennas and receivers are used, the CSD measurements could be determined using the first and second GNSS antennas and GNSS receivers, the first and third GNSS antennas and GNSS receivers, and/or the second and third GNSS antennas and GNSS receivers.

Since CSD measurements are used in method 300 rather than CDD measurements like method 200, the clock bias between the GNSS receivers is not eliminated as it is for method 200. Thus, the method 300 further includes estimating the clock bias between the GNSS receivers based on the CSD measurements (block 305). In some examples, the clock bias between the GNSS receivers is estimated using a global statistical estimator (for example, a particle filter) and the first CSD measurement. This global statistical estimator is then used to hybridize all available sensor measurements. In some examples, the clock bias between GNSS receivers can be identified first based on all CSD measurements (e.g., using a trigonometric-function based averaging algorithm) and then, finely tuned by a local statistical estimator which can also be deployed to hybridize all available sensors measurements. In some examples, the clock bias between the GNSS receivers is estimated prior to validation of any CSD measurement residuals as discussed below with respect to blocks 306-312. In some examples, the CSD measurements are provided to the navigation computer (for example, implementing the global statistical estimator) and the clock bias between the GNSS receivers is estimated prior to determining predicted CSD values based on predicted states as discussed below with respect to block 306.

The method 300 further includes determining predicted CSD values based on predicted states (block 306). In some examples, the predicted CSD values are determined by the navigation computer using a global statistical estimator (for example, a particle filter). In such examples, the predicted states of the global statistical estimator used to determine the predicted CSD values include position of the navigation system, position of the satellites determine from the ephemeris, attitude, and heading, and other estimated CSD quantities (for example, errors in GNSS antennas baseline) based on the previous state of the navigation system. In some examples, the predicted CSD values are determined using the estimated clock bias between the GNSS receivers determined in block 305, and the CSD values are only predicted for subsequent iterations of CSD measurements after the first CSD measurements that are used to estimate the clock bias between the GNSS receivers.

The method 300 further includes determining CSD measurement residuals and related variances based on the CSD measurements and the predicted CSD values (block 308). The CSD measurement residuals are determined by taking the difference between the CSD measurements and the predicted CSD values.

Since the dynamics of all states, which are needed for the measurement residual prediction and are other than the carrier wavelength integer ambiguities and the clock bias between the GNSS receivers (which was determined in block 305), can be well predicted with performance significantly lower than carrier signal wavelength, the CSD measurement residuals can be refined. Since the signs of the CSD measurement residuals cannot be reconstructed, the method 300 further includes applying a wrapping function to the CSD measurement residuals with limit of ±half of the GNSS carrier signal wavelength (block 310).

In order to assure the integrity of the CSD measurements, the method 200 further includes validating the refined CSD measurement residuals (block 312). For the validity test of block 312, it is assumed that the navigation system will be able to measure the change in attitude and heading from an initial prediction (for example, from an attitude alignment algorithm and a standalone GNSS heading algorithm, magnetometer, etc.) and that both, the predicted and measured CSD errors have Gaussian distribution. The CSD measurement residuals are validated by determining whether the covariance of refined CSD measurement residuals satisfies a threshold. In some examples, the threshold is determined using a required Probability of Hazardously Misleading Information (PHMI) value, which is an integrity requirement for the particular application, and an independent sample rate (ISR). The PHMI value and the ISR are used to determine a sigma multiplier that is applied to the CSD measurements residual covariance. In order for the CSD measurement residuals to be validated, the following condition must be met:

$$(K_{ob}^{mod,\nabla})^2 \text{Cov}[\delta\Delta_{ref,i}] < \left(\frac{\lambda}{2}\right)^2$$

where $\lambda$ is the GNSS carrier signal wavelength and $K_{ob}^{mod,\nabla}$ is a sigma multiplier, which is defined as:

$$K_{ob}^{mod,\nabla} = Q^{-1}\left(\frac{PHMI}{ISR}\right)$$

where $Q^{-1}$ is inverse of:

$$Q(x) = \frac{1}{\sqrt{2\pi}} \int_x^\infty e^{\frac{-t^2}{2}} dt$$

In some examples, the validity test described with respect to block 312 is applied for every measurement update (for example, particle filter measurement update). In such examples, either raw carrier phase measurements or carrier phase range measurements, which are determined based on pseudo ranges, raw carrier phases, and delta ranges, can be used.

Using the validity test for every measurement update may restrict the number of CSD measurements available for use in determining attitude and heading of the navigation system. In some examples, the validity test discussed above is only applied in the first iteration. In such examples, the carrier phase ranges integer ambiguities are determined and accumulated carrier phases, usually represented in the form of delta ranges, are used to propagate them during the subsequent iterations. Since the validity test is only applied once in such examples, the threshold can be relaxed (for example, the ISR can be set to 1) and more CSD measurements can be used in the determination of attitude and heading.

The method 300 further includes estimating the attitude and heading using the valid CSD measurements and the inertial measurements (block 314). In some examples, the global statistical estimator (for example, particle filter) integrates/blends/hybridizes the CSD measurements with the inertial measurements from the inertial sensors to estimate the attitude and heading of the navigation system.

By applying the wrapping function and utilizing only CSD measurements that pass the validity test in block 312 for estimation of the attitude and heading, the method 300 does not need to resolve the integer ambiguity and the integrity of the CSD measurements used in the estimation of attitude and heading is assured.

Example Embodiments

Example 1 includes a method for estimating attitude and heading of a system, comprising: obtaining inertial measurements from one or more inertial sensors; obtaining raw carrier phase measurements from two or more Global Navigation Satellite System (GNSS) receivers communicatively coupled to respective GNSS antennas; determining carrier phase double difference (CDD) measurements from the raw carrier phase measurements; determining predicted CDD values based on statistical filter predicted states; determining CDD measurement residuals and respective variances based on the CDD measurements and the predicted CDD values; applying a wrapping function with limit of ±half of a GNSS carrier signal wavelength to the CDD measurement residuals to generate refined CDD measurement residuals; validating the refined CDD measurement residuals to determine valid CDD measurements; and estimating attitude and heading of the system using the valid CDD measurements and the inertial measurements.

Example 2 includes the method of Example 1, further comprising: decorrelating the valid CDD measurements; and wherein estimating the attitude and heading of the system using the valid CDD measurements and inertial measurements includes sequentially processing the decorrelated, valid CDD measurements.

Example 3 includes the method of Example 2, wherein decorrelating the valid CDD measurements includes applying a predetermined factorized measurement noise covariance matrix up to a scaling parameter to the valid CDD measurements.

Example 4 includes the method of any of Examples 1-3, wherein validating the refined CDD measurement residuals to determine valid CDD measurements includes comparing a covariance of the refined CDD measurement residuals to a threshold.

Example 5 includes the method of any of Examples 1-4, wherein validating the refined CDD measurement residuals to determine valid CDD measurements is applied for every measurement update.

Example 6 includes the method of any of Examples 1-4, wherein validating the refined CDD measurement residuals to determine valid CDD measurements is applied only for a first iteration of a measurement update; and wherein the method further comprises determining carrier phase ranges integer ambiguities and propagating the carrier phase ranges using accumulated carrier phases during subsequent iterations of the measurement update.

Example 7 includes a system, comprising: one or more inertial sensors configured to capture inertial measurements; a first Global Navigation Satellite System (GNSS) receiver communicatively coupled to a first GNSS antenna, wherein the first GNSS receiver is configured to receive signals from a plurality of GNSS satellites; a second GNSS receiver communicatively coupled to a second GNSS antenna, wherein the second GNSS receiver is configured to receive signals from a plurality of GNSS satellites; and at least one processor communicatively coupled to a memory, the one or more inertial sensors, the first GNSS receiver, and the second GNSS receiver, wherein the at least one processor is configured to: obtain the inertial measurements from the one or more inertial sensors; obtain raw carrier phase measurements from the first GNSS receiver and the second GNSS receiver; determine carrier phase double difference (CDD) measurements from the raw carrier phase measurements; determine predicted CDD values based on statistical filter predicted states; determine CDD measurement residuals and respective variances based on the CDD measurements and the predicted CDD values; apply a wrapping function with limit of ±half of a GNSS carrier signal wavelength to the CDD measurement residuals to generate refined CDD measurement residuals; validate the refined CDD measurement residuals to determine valid CDD measurements; and estimate attitude and heading of the system using the valid CDD measurements and the inertial measurements.

Example 8 includes the system of Example 7, wherein the at least one processor is further configured to decorrelate the valid CDD measurements; and wherein the at least one processor is configured to estimate the attitude and heading of the system using the valid CDD measurements and inertial measurements includes sequentially processing the decorrelated, valid CDD measurements.

Example 9 includes the system of Example 8, wherein the at least one processor is configured to decorrelate the valid CDD measurements by applying a predetermined factorized measurement noise covariance matrix up to a scaling parameter to the valid CDD measurements.

Example 10 includes the system of any of Examples 7-9, wherein the at least one processor is configured to validate the refined CDD measurement residuals to determine valid CDD measurements by comparing a covariance of the refined CDD measurement residuals to a threshold.

Example 11 includes the system of any of Examples 7-10, wherein the at least one processor is configured to validate the refined CDD measurement residuals to determine valid CDD measurements for every measurement update.

Example 12 includes the system of any of Examples 7-10, wherein the at least one processor is configured to validate the refined CDD measurement residuals to determine valid CDD measurements by for only a first iteration of a measurement update; and wherein the at least one processor is further configured to determine carrier phase ranges integer ambiguities and propagating the carrier phase ranges using accumulated carrier phases during subsequent iterations of the measurement update.

Example 13 includes the system of any of Examples 7-12, further comprising one or more sensors communicatively coupled to the at least one processor, wherein the one or more sensors are configured to provide additional navigation information to the at least one processor.

Example 14 includes the system of any of Examples 7-13, wherein the system is mounted to or incorporated into a vehicle.

Example 15 includes the system of any of Examples 7-14, further comprising: a third GNSS receiver communicatively coupled to a third GNSS antenna, wherein the third GNSS receiver is configured to receive signals from a plurality of GNSS satellites, wherein the third GNSS receiver is communicatively coupled to the at least one processor; wherein the at least one processor is further configured to: obtain raw carrier phase measurements from the third GNSS receiver; and determine CDD measurements from the raw carrier phase measurements obtained from the third GNSS receiver.

Example 16 includes a system, comprising: one or more inertial sensors configured to capture inertial measurements; a first Global Navigation Satellite System (GNSS) receiver communicatively coupled to a first GNSS antenna, wherein the first GNSS receiver is configured to receive signals from a plurality of GNSS satellites; a second GNSS receiver communicatively coupled to a second GNSS antenna, wherein the second GNSS receiver is configured to receive signals from a plurality of GNSS satellites; and at least one processor communicatively coupled to a memory, the one or more inertial sensors, the first GNSS receiver, and the second GNSS receiver, wherein the at least one processor is configured to: obtain the inertial measurements from the one or more inertial sensors; obtain raw carrier phase measurements from the first GNSS receiver and the second GNSS receiver; determine carrier phase single difference (CSD) measurements from the raw carrier phase measurements; determine an estimate of clock bias between the first GNSS receiver and the second GNSS receiver based on the CSD measurements; determine predicted CSD values based on statistical filter predicted states; determine CSD measurement residuals and respective variances based on the CSD measurements and the predicted CSD values; apply a wrapping function with limit of ±half of a GNSS carrier signal wavelength to the CSD measurement residuals to generate refined CSD measurement residuals; validate the refined CSD measurement residuals to determine valid CSD measurements; and estimate attitude and heading of the system using the valid CSD measurements and the inertial measurements.

Example 17 includes the system of Example 16, wherein the at least one processor is configured to validate the refined CSD measurement residuals to determine valid CSD measurements by comparing a covariance of the refined CSD measurement residuals to a threshold.

Example 18 includes the system of any of Examples 16-17, wherein the at least one processor is configured to validate the refined CSD measurement residuals to determine valid CSD measurements for every measurement update.

Example 19 includes the system of any of Examples 16-17, wherein the at least one processor is configured to validate the refined CSD measurement residuals to determine valid CSD measurements by for only a first iteration of a measurement update; and wherein the at least one processor is further configured to determine carrier phase ranges integer ambiguities and propagating the carrier phase ranges using accumulated carrier phases during subsequent iterations of the measurement update.

Example 20 includes the system of any of Examples 16-19, further comprising: a third GNSS receiver communicatively coupled to a third GNSS antenna, wherein the third GNSS receiver is configured to receive signals from a plurality of GNSS satellites, wherein the third GNSS receiver is communicatively coupled to the at least one processor; wherein the at least one processor is further configured to: obtain raw carrier phase measurements from the third GNSS receiver; and determine CDD measurements from the raw carrier phase measurements obtained from the third GNSS receiver.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for estimating attitude and heading of a system, comprising:
    obtaining inertial measurements from one or more inertial sensors;
    obtaining raw carrier phase measurements from two or more Global Navigation Satellite System (GNSS) receivers communicatively coupled to respective GNSS antennas;
    determining carrier phase double difference (CDD) measurements from the raw carrier phase measurements;
    determining predicted CDD values based on statistical filter predicted states;
    determining CDD measurement residuals and respective variances based on the CDD measurements and the predicted CDD values;
    applying a wrapping function with limit of ±half of a GNSS carrier signal wavelength to the CDD measurement residuals to generate refined CDD measurement residuals;
    validating the refined CDD measurement residuals to determine valid CDD measurements; and
    estimating attitude and heading of the system using the valid CDD measurements and the inertial measurements.

2. The method of claim 1, further comprising:
    decorrelating the valid CDD measurements; and
    wherein estimating the attitude and heading of the system using the valid CDD measurements and inertial measurements includes sequentially processing the decorrelated, valid CDD measurements.

3. The method of claim 2, wherein decorrelating the valid CDD measurements includes applying a predetermined factorized measurement noise covariance matrix up to a scaling parameter to the valid CDD measurements.

4. The method of claim 1, wherein validating the refined CDD measurement residuals to determine valid CDD measurements includes comparing a covariance of the refined CDD measurement residuals to a threshold.

5. The method of claim 1, wherein validating the refined CDD measurement residuals to determine valid CDD measurements is applied for every measurement update.

6. The method of claim 1, wherein validating the refined CDD measurement residuals to determine valid CDD measurements is applied only for a first iteration of a measurement update; and
    wherein the method further comprises determining carrier phase ranges integer ambiguities and propagating the carrier phase ranges using accumulated carrier phases during subsequent iterations of the measurement update.

7. A system, comprising:
    one or more inertial sensors configured to capture inertial measurements;
    a first Global Navigation Satellite System (GNSS) receiver communicatively coupled to a first GNSS antenna, wherein the first GNSS receiver is configured to receive signals from a plurality of GNSS satellites;
    a second GNSS receiver communicatively coupled to a second GNSS antenna, wherein the second GNSS receiver is configured to receive signals from a plurality of GNSS satellites; and
    at least one processor communicatively coupled to a memory, the one or more inertial sensors, the first GNSS receiver, and the second GNSS receiver, wherein the at least one processor is configured to:
        obtain the inertial measurements from the one or more inertial sensors;
        obtain raw carrier phase measurements from the first GNSS receiver and the second GNSS receiver;
        determine carrier phase double difference (CDD) measurements from the raw carrier phase measurements;
        determine predicted CDD values based on statistical filter predicted states;
        determine CDD measurement residuals and respective variances based on the CDD measurements and the predicted CDD values;
        apply a wrapping function with limit of ±half of a GNSS carrier signal wavelength to the CDD measurement residuals to generate refined CDD measurement residuals;
        validate the refined CDD measurement residuals to determine valid CDD measurements; and
        estimate attitude and heading of the system using the valid CDD measurements and the inertial measurements.

8. The system of claim 7, wherein the at least one processor is further configured to decorrelate the valid CDD measurements; and
    wherein the at least one processor is configured to estimate the attitude and heading of the system using the valid CDD measurements and inertial measurements includes sequentially processing the decorrelated, valid CDD measurements.

9. The system of claim 8, wherein the at least one processor is configured to decorrelate the valid CDD measurements by applying a predetermined factorized measurement noise covariance matrix up to a scaling parameter to the valid CDD measurements.

10. The system of claim 7, wherein the at least one processor is configured to validate the refined CDD measurement residuals to determine valid CDD measurements by comparing a covariance of the refined CDD measurement residuals to a threshold.

11. The system of claim 7, wherein the at least one processor is configured to validate the refined CDD measurement residuals to determine valid CDD measurements for every measurement update.

12. The system of claim 7, wherein the at least one processor is configured to validate the refined CDD measurement residuals to determine valid CDD measurements by for only a first iteration of a measurement update; and
wherein the at least one processor is further configured to determine carrier phase ranges integer ambiguities and propagating the carrier phase ranges using accumulated carrier phases during subsequent iterations of the measurement update.

13. The system of claim 7, further comprising one or more sensors communicatively coupled to the at least one processor, wherein the one or more sensors are configured to provide additional navigation information to the at least one processor.

14. The system of claim 7, wherein the system is mounted to or incorporated into a vehicle.

15. The system of claim 7, further comprising:
a third GNSS receiver communicatively coupled to a third GNSS antenna, wherein the third GNSS receiver is configured to receive signals from a plurality of GNSS satellites, wherein the third GNSS receiver is communicatively coupled to the at least one processor;
wherein the at least one processor is further configured to:
obtain raw carrier phase measurements from the third GNSS receiver; and
determine CDD measurements from the raw carrier phase measurements obtained from the third GNSS receiver.

16. A system, comprising:
one or more inertial sensors configured to capture inertial measurements;
a first Global Navigation Satellite System (GNSS) receiver communicatively coupled to a first GNSS antenna, wherein the first GNSS receiver is configured to receive signals from a plurality of GNSS satellites;
a second GNSS receiver communicatively coupled to a second GNSS antenna, wherein the second GNSS receiver is configured to receive signals from a plurality of GNSS satellites; and
at least one processor communicatively coupled to a memory, the one or more inertial sensors, the first GNSS receiver, and the second GNSS receiver, wherein the at least one processor is configured to:
obtain the inertial measurements from the one or more inertial sensors;
obtain raw carrier phase measurements from the first GNSS receiver and the second GNSS receiver;
determine carrier phase single difference (CSD) measurements from the raw carrier phase measurements;
determine an estimate of clock bias between the first GNSS receiver and the second GNSS receiver based on the CSD measurements;
determine predicted CSD values based on statistical filter predicted states;
determine CSD measurement residuals and respective variances based on the CSD measurements and the predicted CSD values;
apply a wrapping function with limit of ±half of a GNSS carrier signal wavelength to the CSD measurement residuals to generate refined CSD measurement residuals;
validate the refined CSD measurement residuals to determine valid CSD measurements; and
estimate attitude and heading of the system using the valid CSD measurements and the inertial measurements.

17. The system of claim 16, wherein the at least one processor is configured to validate the refined CSD measurement residuals to determine valid CSD measurements by comparing a covariance of the refined CSD measurement residuals to a threshold.

18. The system of claim 16, wherein the at least one processor is configured to validate the refined CSD measurement residuals to determine valid CSD measurements for every measurement update.

19. The system of claim 16, wherein the at least one processor is configured to validate the refined CSD measurement residuals to determine valid CSD measurements by for only a first iteration of a measurement update; and
wherein the at least one processor is further configured to determine carrier phase ranges integer ambiguities and propagating the carrier phase ranges using accumulated carrier phases during subsequent iterations of the measurement update.

20. The system of claim 16, further comprising:
a third GNSS receiver communicatively coupled to a third GNSS antenna, wherein the third GNSS receiver is configured to receive signals from a plurality of GNSS satellites, wherein the third GNSS receiver is communicatively coupled to the at least one processor;
wherein the at least one processor is further configured to:
obtain raw carrier phase measurements from the third GNSS receiver; and
determine CDD measurements from the raw carrier phase measurements obtained from the third GNSS receiver.

* * * * *